Patented May 10, 1938

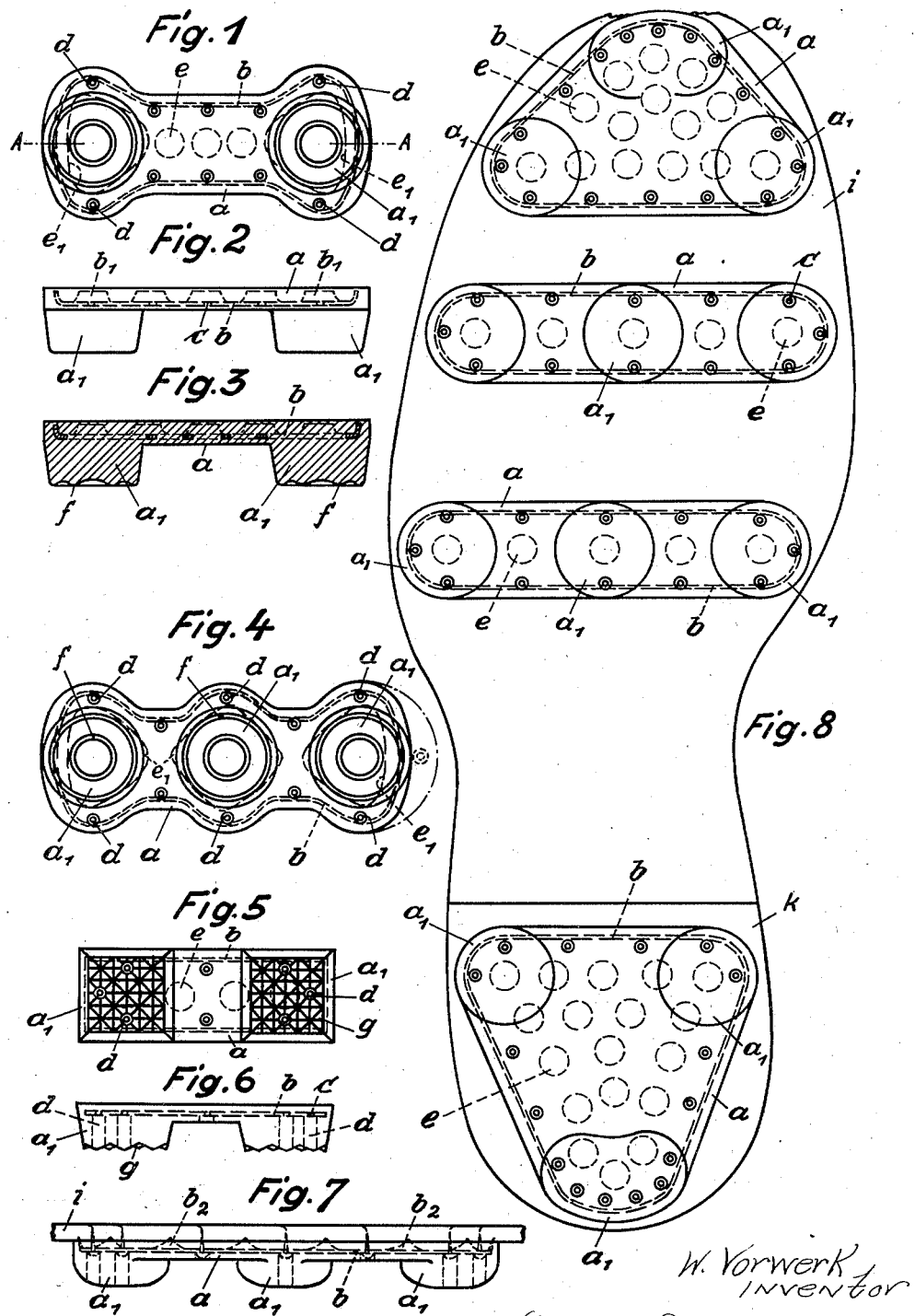

2,116,956

UNITED STATES PATENT OFFICE 2,116,956

ANTISLIP DEVICE FOR FOOTWEAR

Wilhelm Vorwerk, Wuppertal-Barmen, Germany

Application December 5, 1935, Serial No. 53,041
In Germany February 12, 1935

1 Claim. (Cl. 36—59).

It has already been proposed to use rubber studs as an anti-slip device for shoes, more particularly sports shoes, and to arrange several such studs on a rubber base plate common to them all. In the proposed form this anti-slip device is useless in practice, as it has not been recognized that it is necessary to give rigidity to the elastic rubber base-plate which forms a unit with the studs. In the known anti-slip device the rubber base-plate, when subjected to one-sided stressing, owing to a knock, has to take up the whole of the knock at one place. The consequence of this is, that the elastic rubber plate is at this place compressed or distorted to a greater or less extent, when it may easily become torn in or even right off. Moreover the entire knock affects only a few of the fixing means (nails or screws) of the anti-slip device, so that loosening and canting of the anti-slip device soon occurs. The known multi-stud rubber anti-slip device cannot therefore be fixed securely. The possibility of a secure way of fixing is however an important factor for the utility of any anti-slip device, more particularly when it is to be used for sports shoes, that is, will be subjected to severe knocks.

The invention overcomes the disadvantages of the known anti-slip devices for shoes and consists in this, that in the rubber base-plate supporting two or more rubber studs arranged in any way a continuous, flexible reinforcing plate of metal or some other suitable material and preferably adapted to the shape of the base of the anti-slip device is embedded, the reinforcing plate being suitably provided with pointed or flattened tooth-like projections and with perforations of any shape and arranged in any manner in addition to the holes for the fixing means.

Through the reinforcing insertion which extends right over the rubber base-plate of the anti-slip device any one-sided effect due to knocks is transmitted to the entire breadth or length of the anti-slip device and is thus taken up simultaneously by all the nails or screws and also by the tooth-like projections, when such are provided, of the reinforcing plate, which engage in the sole, so that the specific stressing of the individual fixing means becomes extremely small and consequently any tearing off or canting of the anti-slip device is made practically impossible. Furthermore, the continuous reinforcing plate of the anti-slip device gives the shoe, and consequently the foot, a better hold than the anti-slip means hitherto known and prevents the formation of uneven places above the individual studs, which in the known anti-slip devices cause pain at the sole of the foot.

A constructional example of the new anti-slip device is illustrated in the accompanying drawing in which Fig. 1 is a plan view.

Fig. 2 a side elevation and

Fig. 3 a section on line A—A of Fig. 1.

Figs. 4 and 5 show further constructional forms in plan view.

Fig. 6 is a side elevation of Fig. 5.

Fig. 7 shows a third constructional form in side elevation.

Fig. 8 shows an example of how a shoe is fitted with the new rubber anti-slip device.

On a rubber base plate $a$ of any shape or size a plurality, preferably 2 or 3, round, oval or cornered rubber studs $a_1$ are arranged in any suitable manner with respect to one another. As shown in Figs. 1, 3, and 4 the rubber studs may for increasing the resistance to sliding at the tread be provided with ribs $f$ or grooves or with protuberances $g$ formed by grooves or have a cup-shaped surface.

In the rubber base-plate is embedded a continuous flexible reinforcing plate $b$ of metal or some other suitable material, which is preferably adapted to the shape of the base of the anti-slip device. The plate $b$ besides being provided with nail or screw holes $c$ is also suitably provided with perforations $e$ of any shape or arranged in any manner, through which the rubber mass can penetrate, when the reinforcing plate is being vulcanized-in, so that a firm embedding of the plate in the rubber body takes place, such that there will be no separation of the anti-slip device by the insertion $b$ into an upper and lower part. The reinforcing plate is provided, preferably at its edge, with projections which stand up at an angle, either flattened projections $b_1$ (Figs. 2 and 3) or sharp tooth-like projections $b_2$ (Fig. 7), which, on the anti-slip device being nailed or screwed on, press through the rubber plate into the leather sole $i$ or the leather heel $k$ (Fig. 8) causing the anti-slip device to obtain a firm grip. The projections $b_1$ or $b_2$ also act as a support for the reinforcing plate on the sole or heel of the shoe, when the device is being nailed on, so that the springing of the rubber plate is reduced during the nailing operation and this operation is thus rendered more easy.

In the examples shown in Figs. 1 and 4 the rubber base-plate $a$ and the reinforcing plate $b$ are widened at the studs $a_1$, so that under each stud a relatively large perforation $e_1$ can be provided in the reinforcing plate. The result of this is, that the rubber core which connects the rubber studs $a_1$ with the rubber base plate $a$ and penetrates through the reinforcing insertion is given as large a cross-section as possible, whereby any tearing off of the rubber studs is prevented. Instead of one large perforation a plurality of smaller perforations may of course be provided under each stud in the widened part of the reinforcing plate. Furthermore, through the widening of the rubber base plate and the reinforcing plate at the studs the fixing holes $d$, which in the constructional forms shown in Figs. 5 to 8 for instance are provided in the studs, can be placed outside the studs into the rubber base plate. This arrangement prevents any weakening of the rubber studs by fixing holes and also facilitates the fixing of the anti-slip device.

Through the reinforcing insertion the anti-slip device is given a relatively great resistance to stresses caused by knocks, since, owing to the provision of the insertion, any effect due to knocks is distributed simultaneously to all nails or screws and to the tooth-like projections which engage in the sole $i$, when these are provided, so that the specific stressing of the individual fixing means becomes exceedingly small and any tearing off or canting of the anti-slip device, if properly fixed, becomes impossible.

The shape of the new anti-slip device is optional. An elongated or triangular shape is particularly suitable, the latter being specially adapted for protecting the toe of the sole and the heel. The rubber bodies may be fixed to the sole $i$ of the shoe in any number spaced apart (Fig. 8) or placed close together. In every case they ensure complete flexibility in the walking direction, while on the other hand, they give the shoe and consequently the foot a better grip of the ground at right angles to the direction of walking.

What I claim is:—

An anti-slip device for footwear comprising a rubber base plate, a plurality of rubber stud-like protuberances on and integral with the base plate, a reinforcing plate completely embedded in the base plate and extending close to the edges of the base plate, the reinforcing plate having apertures so as to provide areas of rubber of relatively large cross-section for connecting the parts of the device above and below the reinforcing plate, and the reinforcing plate also having small holes around its edge and outside the area covered by the protuberances, for the passage of nails or screws for fixing the device to the footwear.

WILHELM VORWERK.